(12) United States Patent
Scott

(10) Patent No.: US 11,658,940 B1
(45) Date of Patent: May 23, 2023

(54) CLIENT-SIDE VIRTUAL PRIVATE NETWORK (VPN) CHAINING

(71) Applicant: OSOM Products, Inc., Cupertino, CA (US)

(72) Inventor: Oliver Scott, Alexandria (CA)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

(21) Appl. No.: 18/045,107

(22) Filed: Oct. 7, 2022

(51) Int. Cl.
*H04L 29/06* (2006.01)
*H04L 9/40* (2022.01)

(52) U.S. Cl.
CPC ................................. *H04L 63/0272* (2013.01)

(58) Field of Classification Search
CPC .................................................. H04L 63/0272
See application file for complete search history.

(56) References Cited

U.S. PATENT DOCUMENTS

| | | | | |
|---|---|---|---|---|
| 2010/0218248 A1* | 8/2010 | Nice | ...................... | H04L 67/563 726/15 |
| 2012/0005746 A1 | 1/2012 | Wei et al. | | |
| 2013/0340067 A1 | 12/2013 | Lindteigen | | |
| 2017/0171156 A1* | 6/2017 | Schultz | .................. | H04L 9/3215 |
| 2018/0234387 A1 | 8/2018 | Adams et al. | | |
| 2018/0302443 A1* | 10/2018 | Weiss | ...................... | G06F 21/604 |
| 2020/0213183 A1* | 7/2020 | Ojha | ................... | H04W 36/305 |
| 2022/0368675 A1* | 11/2022 | Narula | ................ | H04L 43/0817 |

OTHER PUBLICATIONS

United States Patent & Trademark Office (USPTO), International Search Report and Written Opinion, PCT/US2022/077819, dated Jan. 20, 2023, counterpart to U.S. Appl. No. 18/045,107.

* cited by examiner

*Primary Examiner* — Shin-Hon (Eric) Chen
(74) *Attorney, Agent, or Firm* — Perkins Coie LLP; Alberto Araiza

(57) ABSTRACT

A client-side virtual private network (VPN) chaining architecture can provision multiple sessions for multiple VPN clients that are configured to communicate packet traffic in parallel between an end-user device and one or more destinations. The client-side chaining architecture can capture packet traffic per specific users/apps and process (e.g., drop) or reroute the captured packet traffic for different VPN clients. For example, packet traffic can be rerouted from a main VPN client to a secondary VPN client. As such, there can be multiple VPN clients that are simultaneously chained in various ways to the same end-user device.

19 Claims, 6 Drawing Sheets

CLIENT-SIDE VIRTUAL PRIVATE NETWORK (VPN) CHAINING

BACKGROUND

A virtual private network (VPN) extends a private network across a public network and enables users to send and receive data across shared or public networks as if their computing devices were directly connected to the private network. Benefits of a VPN include increases in functionality, security, and management of a private network. It provides access to resources that are inaccessible on the public network and is typically used for remote workers. Encryption is common but not a necessary part of a VPN connection.

A VPN is created by establishing a virtual point-to-point connection through the use of dedicated circuits or with tunneling protocols over existing networks. A VPN that is available from the public internet can provide some of the benefits of a wide area network (WAN). From a user perspective, the resources available within the private network can be accessed remotely. VPNs can be classified into several categories. For example, a remote access VPN is a host-to-network configuration that is analogous to connecting a computer to a (LAN). This type of network provides access to an enterprise network, such as an intranet, and can be employed for remote workers who need access to private resources. In another example, a site-to-site configuration expands a network across geographically disparate offices or to a data center. The interconnecting link may run over a dissimilar intermediate network, such as two IPv6 networks connected over an IPv4 network.

VPN chaining is a technique in which multiple VPN servers are serially chained to improve online privacy while on the internet. As such, a user is not connecting to a single VPN but to multiple ones in a layered system where, for example, a computer connects to a first VPN, which connects to a second VPN, which connects to the internet. An advantage is that it becomes increasingly difficult to track users when VPN servers are chained. There are disadvantages; for instance, the setup is complicated, maintaining multiple VPN accounts is more expensive, and there is still a possibility of being tracked.

BRIEF DESCRIPTION OF THE DRAWINGS

Detailed descriptions of implementations of the present technology will be described and explained through the use of the accompanying drawings.

Figure 1:
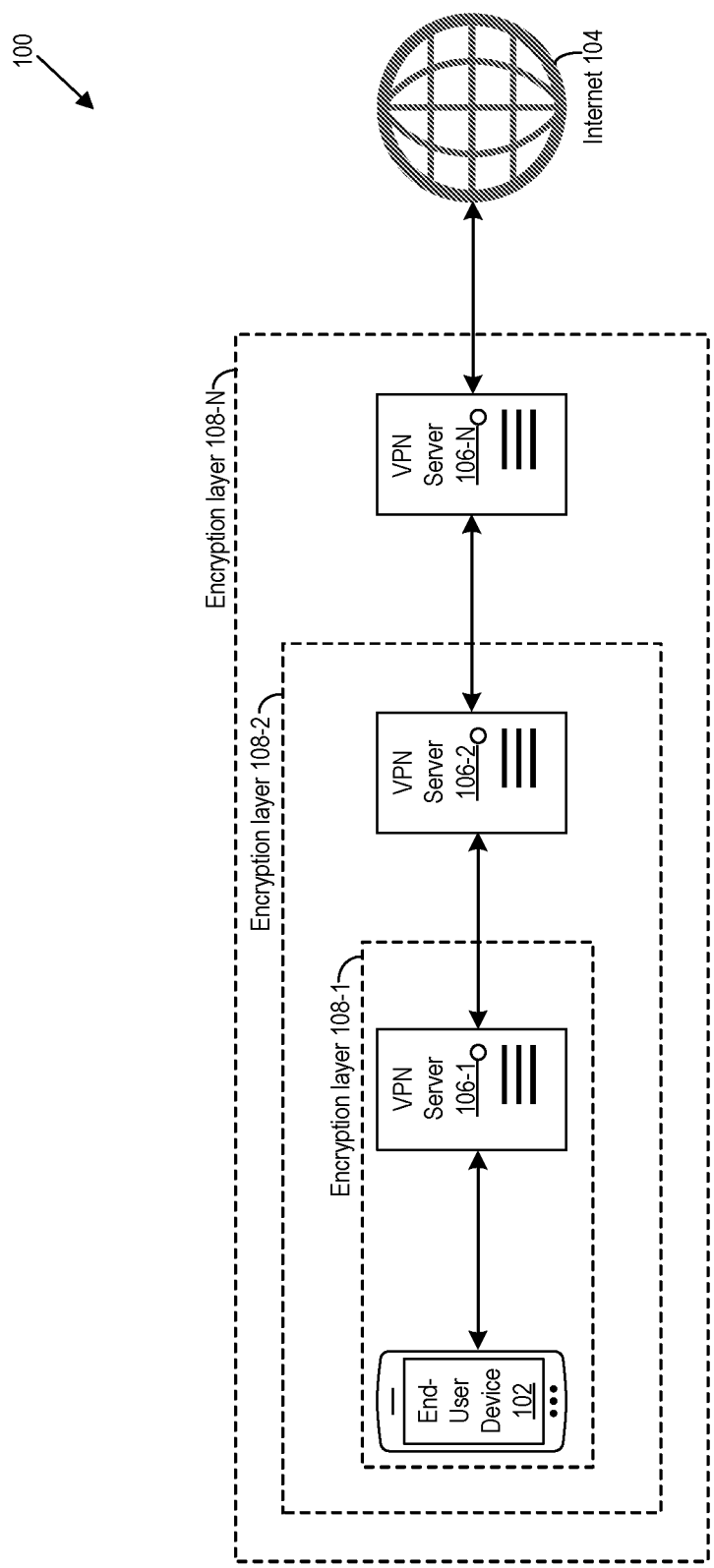
FIG. 1 is a system diagram that illustrates server-side VPN chaining.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to local client-side VPN chaining where an end-user device such as a handheld mobile device (e.g., smartphone) can operate two or more VPN clients to communicate packet traffic at the same time. The VPN chaining architecture can capture packet traffic and sort and/or redirect the packet traffic between VPN clients to, for example, filter or drop certain packet traffic at different levels of granularity from the entire device or particular software applications ("apps"). A VPN chain can nest a VPN tunnel in another VPN tunnel to provide additional security by concealing a destination. Another benefit of this architecture includes the ability to perform targeted packet filtering.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

VPN Chaining

FIG. 1 is a system diagram that illustrates server-side VPN chaining that cascades two or more VPN servers and can add encryption layers. The architecture for a server-side VPN chain (also referred to as "multi-hop VPN" or a "remote VPN") has at least two serially linked VPN servers (also referred to as a "double VPN") between an end-user and a destination. The system 100 includes an end-user device 102 that is communicatively coupled to the internet 104 through a cascading series of VPN servers 106-1 through 106-N (collectively referred to as "VPN servers 106" or individually as "VPN server 106"). The internet 104 represents a network that can include or be coupled to a destination. For example, a destination of packet traffic from the end-user device 102 can include a website on the internet 104 or a private network coupled to the internet 104.

As shown, the system 100 includes optional encryption layers 108-1 through 108-N for respective VPN servers 106-1 through 106-N. For example, the encryption layer 108-1 secures a connection of the end-user device 102 to the VPN server 106-1. The encryption layer 108-2 secures connections between the end-user device 102 and the VPN server 106-2. The encryption layer 108-N secures the connections between the end-user device 102 and the VPN server 106-N. Thus, the encryption layers 108-1 through 108-N can combine different encryption protocols in a multi-hop VPN architecture.

As such, data that is communicated between the end-user device 102 and a destination (e.g., the internet 104) is encapsulated multiple times and can be secured by one, two, three, or more encryption layers. For example, data that is communicated from the end-user device 102 to the internet 104 is serially encrypted by the end-user device 102, VPN server 106-1, and the VPN server 106-2. As a result, the multi-layer encrypted data requires at least three levels of decryption and decapsulation to obtain the original data. Likewise, data communicated from the internet 104 to the user device 102 can be processed in accordance with the encryption layers 108-N through 108-1, in reverse order.

The encryption layers 108-1 through 108-N can be different or the same from each other. In one example, the end-user device 102 can encode/decode one type of data and the VPN servers 106 can encode/decode one type of data and not another type of data, based on an encryption protocol (also referred to as an "encryption scheme"). In general, an encryption scheme converts an original representation of information, known as plaintext, into an alternative form known as ciphertext. Ideally, only authorized parties can decipher a ciphertext back to plaintext and access the original information. However, encryption does not itself prevent a bad actor from intercepting the encrypted data but denies intelligible content to the bad actor. An encryption scheme usually uses a pseudo-random encryption key generated by an algorithm. It is usually possible to decrypt the encrypted data without possessing the key; however, considerable computational resources and skills are typically required. An authorized recipient can readily decrypt the encrypted data with a key provided by the originator.

Thus, in a single VPN, data is encapsulated and encrypted at a user device and is routed to a server, which decrypts and decapsulates the received data and sends the data to the destination. In contrast, in multi-hop VPN, data is encrypted on both the end-user device and a server. A first server can replace an encryption layer or add another layer of encryption on top of the encryption layer provided by the end-user device. The data is transmitted to a second server, which can decrypt, decapsulate, encapsulate, and encrypt the data and so on until the data reaches the destination. Thus, an encryption layer can be replaced or added at multiple servers in a multi-hop VPN architecture. Thus, multi-hop VPN chaining offers additional security levels by cascading additional servers compared to a single VPN. However, any encryption is unnecessary and, as such, a multi-hop VPN service does not necessarily include an encryption scheme.

In client-side VPN chaining, an end-user device can use more than one VPN clients for one or more user profiles at the same time, in parallel. A "VPN client" can refer to a software-based technology that establishes a secure connection between an end-user device and a destination. Some VPN clients work in the background automatically, while others have front-end interfaces that allow users to interact with and configure them. A VPN client can be provisioned for an entire device to capture all packet traffic to/from the entire device.

The disclosed technology improves over having a single VPN client for an entire device with multiple VPN clients that can be provisioned for the device on a per user basis, enabling one or more VPN clients for one or more apps on the end-user device. As a result, the client-side chaining architecture does not need to capture all data to/from the entire device; instead, data can be captured per user or per app and rerouted between VPN clients, through their respective VPN interfaces. As such, selected packet traffic can be captured, processed, and rerouted for different VPN clients and/or dropped. For example, packet traffic can be rerouted from a main VPN client to a secondary VPN client. Thus, there can be multiple VPN clients that are simultaneously chained to the same end-user device and multiple user profiles can be chained together in various ways.

Figure 2A:
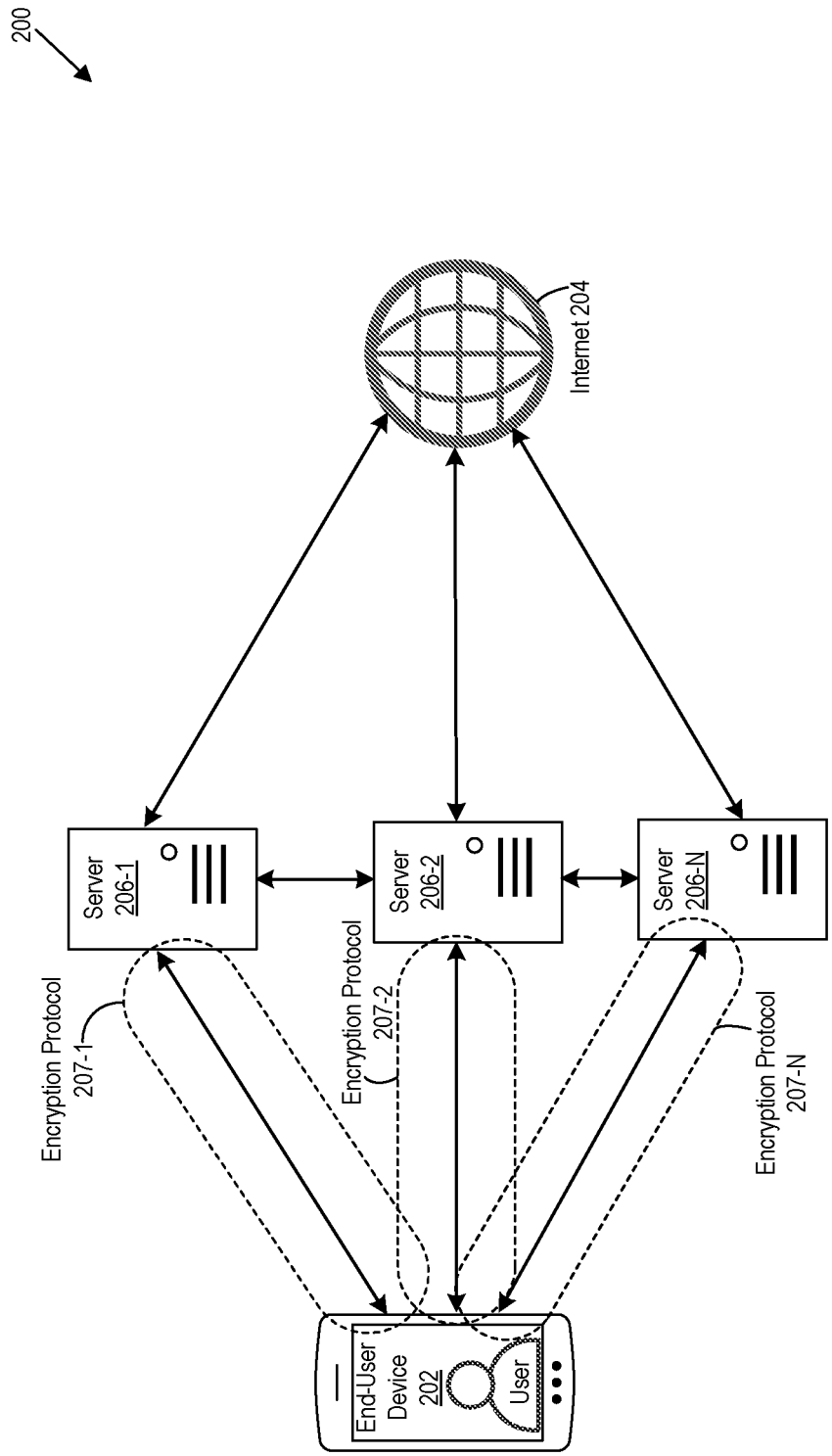
FIG. 2A is a system diagram that illustrates client-side VPN chaining.
Figure 2B:
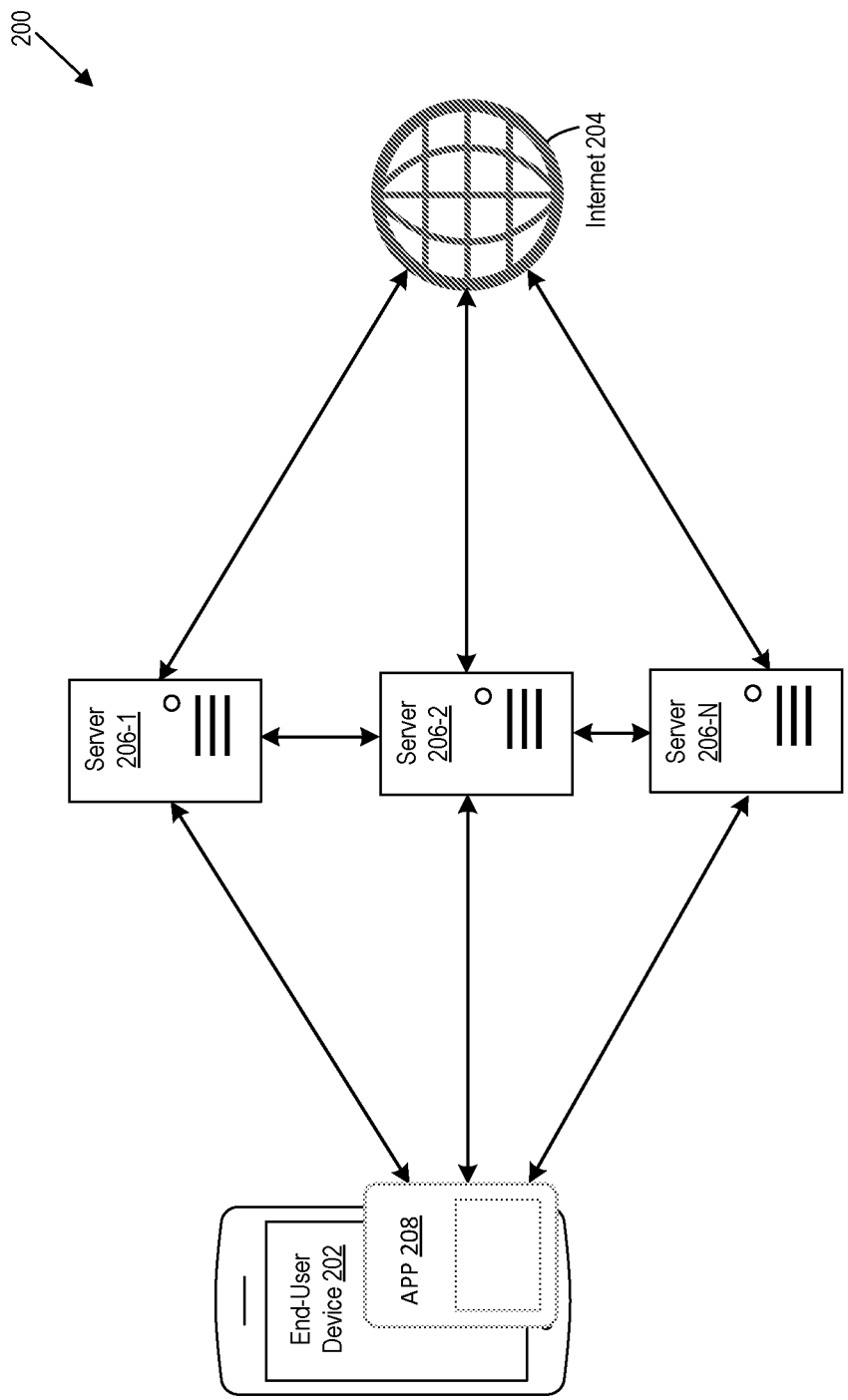
FIG. 2B is a system diagram that illustrates client-side VPN chaining for a common application on an end-user device.
Figure 2C:
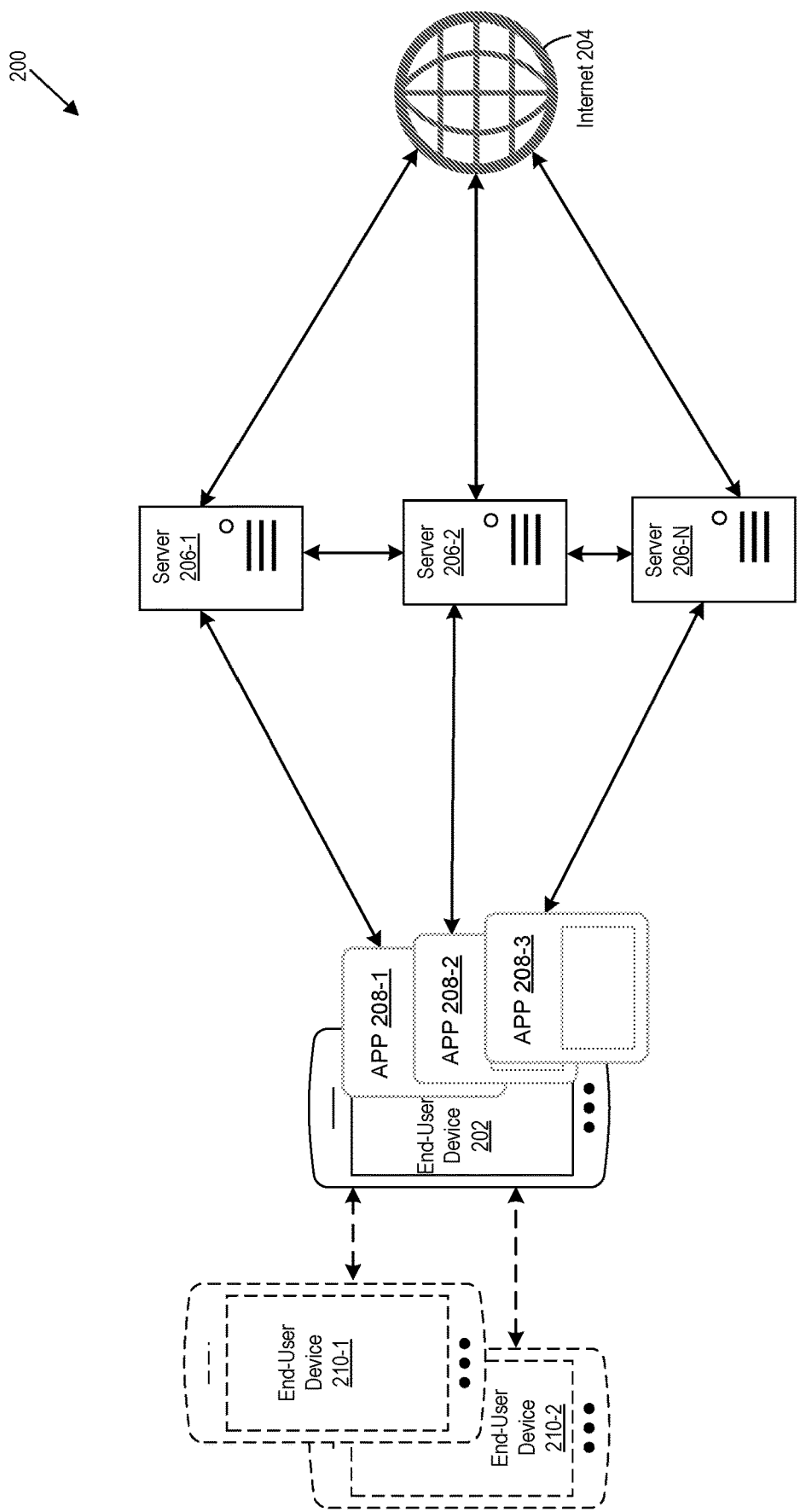
FIG. 2C is a system diagram that illustrates client-side VPN chaining for different applications on an end-user device.

FIGS. 2A through 2C illustrate examples of client-side VPN chaining. A system 200 includes an end-user device 202 (e.g., smartphone) that is communicatively coupled to the internet 204 via servers 206-1 through 206-N (collectively referred to as "servers 206" or individually as "server 206"). Packet traffic is routed between the end-user device 202 and the internet 204 through the servers 206. The packet traffic can travel through different combinations of the servers 206. In bidirectional communications, response packets normally use the reverse route back. That is, the same pathway is used for bidirectional communications between the end-user device 202 and the internet 204. Using different routes for bidirectional communications would require additional configurations, especially in encrypted scenarios. That is, on-site deployments require servers of a pathway to be aware of each other to route client-side chained traffic. For example, server 206-1 can be a usual remote VPN server and server 206-2 can be a Tor entry node should, assuming that the VPN server can and is allowed to forward traffic to the Tor network. Thus, central to client-side chaining is forcing the upstream interface of a VPN client to be another VPN client (e.g., instead of the Wi-Fi or cellular interfaces which are directly internet-facing).

FIG. 2A implements optional encryption protocols 207-1 through 207-N, which are associated with the respective servers 206-1 through 206-N. The encryption protocol 207-1 secures data communicated between the end-user device 202 and the server 206-1, the encryption protocol 207-2 secures data communicated between the end-user device 202 and the server 206-2, and the encryption protocol 207-N secures data communicated between the end-user device 202 and the server 206-N. Any bidirectional data exchanged between the end-user device 202 and one or more destinations such as a website on the internet 204 can occur through a combination of chained VPN clients using the same pathway for the bidirectional communications. For example, data that is communicated from the end-user device 102 to a website on the internet 104 can be routed on a pathway through a combination of the server 206-1 through 206-N, and data communicated back from the website to the end-user device 202 is routed through the same pathway formed by the same combination of the servers 206-1 through 206-N.

An advantage of VPN chaining includes enhanced privacy and security by masking an original IP address of the end-user device 202 with another IP address for a server 206. The client-side VPN chain can also keep a targeted destination unknown to the internet service provider (ISP), despite that the ISP can detect that a user is using a VPN. Further, VPN chaining can better hide a location of the end-user device 202. For example, when multiple servers are in different areas, user traffic is masked because there are numerous encryption schemes between real and virtual locations.

The disclosed client-side chaining can also improve connection speed and reduce power consumption (e.g., extend the battery life of an end-user device) compared to other VPN technologies. In one implementation, existing IP rules are modified so that a next interface via which the packets will have to go through a VPN client (e.g., app running on a particular user) is set to another VPN interface from another VPN client running on another user. For example, the rules can be manipulated in a routing policy database to control the route selection algorithm. In contrast, a routing algorithm that is used in the Internet makes routing decisions based only on the destination address of packets. The disclosed technology can, however, route packets differently depending not only on destination addresses, but also on other packet fields such as a source address, IP protocol, transport protocol ports or even packet payload. In one example, a rule is selected for a packet based on a source address, destination address, incoming interface, and/or another feature of the packet and, if the selector matches the packet, the action is performed (e.g., routes to a next VPN client). The disclosed technology can thus avoid duplicating packets across interfaces or using a complex set of IP tables, which require more processing to occur at the system level, thereby resulting in greater power consumption and battery drain.

The packet traffic communicated in the client-side VPN chain architecture can be redirected between the VPN clients to capture traffic at different levels of granularity from the entire device or particular apps. For example, FIG. 2B is a system diagram that illustrates client-side VPN chaining for a common application 208 ("app 208") on an end-user device 202. As shown, the app 208 can send or receive packet traffic on sessions over different VPN clients via the servers 206-1 through 206-N to one or more destinations (e.g., on the internet 204). In other words, the app 208 is communicatively coupled in parallel to a common or different destinations through servers 206-1 through 206-N. As such, the app 208 can communicate user data via any of the servers 206.

The system 200 can route different types of data or packets associated with the app 208 via different VPN clients (e.g., in a chain of VPN clients). In one example, a first type of content (e.g., streaming media) is communicated via a first VPN client from the internet 204 to the app 208, and a second type of content (e.g., advertisements (ads)) is routed via a second VPN client from the internet 204 to the app 208. For example, the end-user device 202 and/or the server 206-1 can receive both the first and second types of content from the internet 204. The end-user device 202 and/or server 206-1 will allow the first type of data to pass to the app 208 but reroute the second type of data to the server 206-2, which will allow the second type of data to pass to the app 208. In another example, the end-user device 202 and/or the server 206-1 allows the first type of data to pass and rejects/blocks the second type of data, whereas the server 206-2 can reject/block the first type of data but allow the second type of data to pass to the app 208.

As such, the system 200 can bifurcate different data or packet types through different VPN clients and/or a combination of VPN clients. Other data or packet types can likewise be separated into additional VPN clients. A user can therefore control the information that is presented on the end-user device 202. For example, the user can allow content received over one VPN client and block content (e.g., ads) communicated via a second VPN client. Likewise, information input to or generated by the app 208 can be segmented into different VPN clients, which can be configured to allow, block, or reroute segmented data or packet types. For example, sensitive data can be routed through a VPN client that blocks sensitive data from reaching a particular destination. Although not shown in FIG. 2B, the system 200 can implement encryption schemes similar to those shown in FIG. 2A.

FIG. 2C illustrates client-side VPN chaining for multiple apps on the end-user device 202. The VPN clients can similarly operate as described earlier but across multiple applications 208-1 through 208-3 (also collectively referred to as "apps 208" or individually as "app 208") to send or receive data via respective VPN clients to one or more destinations (e.g., the internet 204). In other words, the apps 208 are communicatively coupled to the internet 204 through parallel servers 206-1 through 206-N and the apps 208 can communicate user data exclusively through assigned VPN clients. In one example, the app 208-1 can route first packet traffic via the server 206-1 to a first website on the internet 204, the app 208-2 can route second packet traffic via the server 206-2 to a second website on the internet 204, and the app 208-3 can route third packet traffic via the server 206-N to a third website on the internet 204.

In another example, different data/packet types of the apps 208 are separated for different VPN clients. In particular, a first type of data/packet is communicated from the apps 208 via the server 206-1 to different websites on the internet 204, a second type of data can be communicated from the apps 208 via the server 206-2 to the websites, and a third type of data can be communicated from the apps 208 via the server 206-3 to the websites. Likewise, data from the websites to the apps 208 can be sorted for different VPN clients and filtered before reaching the apps 208. The system 200 can implement encryption schemes for the different VPN clients, as shown in FIG. 2A. In addition, FIG. 2C shows that the end-user device 202 can be configured as a hot spot to host other end-user devices (e.g., end-user devices 210-1 and 210-2) to thereby provide VPN client access to the other end-user devices.

Figure 3:
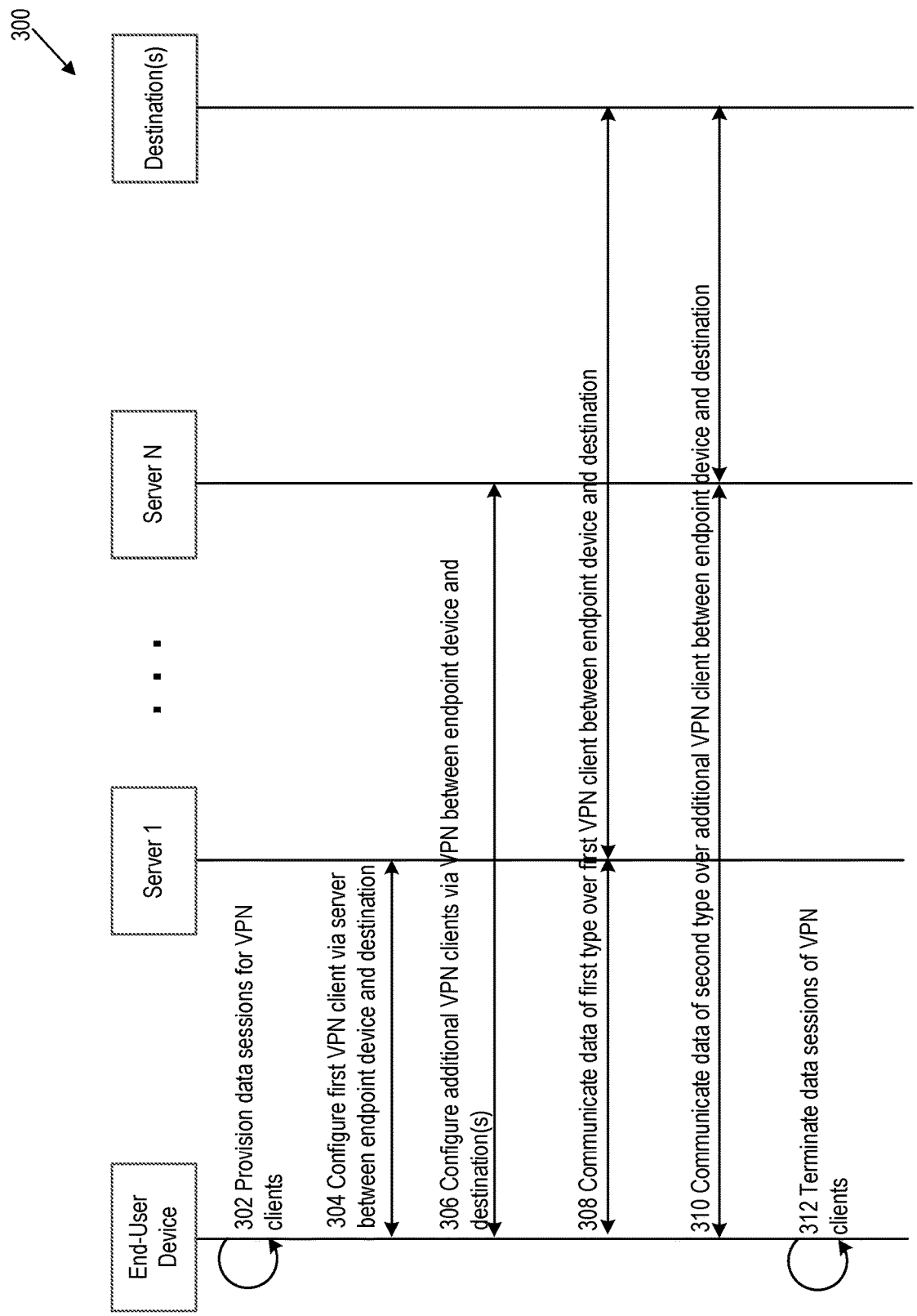
FIG. 3 is a flowchart that illustrates processes of client-side VPN chaining.

FIG. 3 is a flowchart that illustrates processes 300 of client-side VPN chaining. The processes 300 can be performed by a system including one or more end-user devices such as a handheld mobile device (e.g., smartphone) or one or more servers and destination devices. The destination devices can include servers hosting to one or more websites on the internet or another network. The system can include at least one hardware processor and at least one non-transitory memory storing instructions, which, when executed by the at least one hardware processor, cause the system to perform the processes 300.

At 302, the system establishes multiple sessions for VPN clients that are configured to concurrently communicate packet traffic between an end-user device and one or more destinations (e.g., webpages on the internet). Each VPN client is a piece of computer hardware and/or software that accesses a VPN service. A server can be on another computer system, in which case the client accesses a VPN service by way of a network. The term "client" can also be applied to the end-user device that runs the client software or users that use the client software. The clients and servers may be computer programs that run on the same machine and connect via inter-process communication techniques. In one example, servers that support multiple VPN clients are configured to simultaneously exchange data with a common app that resides on the end-user device.

The system can provision a VPN client on a per user basis, enabling one or more VPN clients for one or more apps on the end-user device. As a result, the client-side chaining architecture can capture packet traffic per user or per app and reroute the captured packet traffic between VPN clients. As such, selected packet traffic can be captured, processed, and routed for different VPN clients or dropped, for example. Thus, multiple VPN clients are chained to the end-user device and multiple user profiles can be chained together in various ways.

At 304, the system configures a first VPN client via a first server between the end-user device and a destination. The first VPN client can be configured to route a first type of data between the end-user device and the destination. Additional VPN clients can be configured to communicate data of a single app concurrently between the end-user device and destination(s). In one example, different VPN clients are configured to communicate data concurrently for respective apps running on the end-user device to the same or respective destinations. The first VPN client is established for the end-user device to couple to the destination(s) over one or more networks.

At 306, the system configures additional VPN clients between the end-user device and destination(s) via additional servers over the network(s). In one example, an additional VPN client is configured to route a second type of data to a destination. The second type of data can be the same or different from the first type of data. The first VPN client and the additional VPN clients are independently operable. In one example, the end-user device communicates a first data type on a first session via the first VPN client and communicates a second data type on a second session via the second VPN client. The first VPN client can allow the first type of data and disallow the second type of data. Moreover, the additional VPN client can allow the second type of data and disallow communication of the first type of data. As such, the system can bifurcate data based on its type for different VPN clients. In one example, the first data type corresponds to a first content type and the second data type corresponds to a second content type different from the first content type.

At 308, data is communicated over the first VPN client via the first server between the end-user device and destination(s). In one example, the end-user device communicates certain data (e.g., of the first type) on the first session via a first VPN client of the multiple VPN clients to a first destination. The data communicated via the first VPN client can be secured in accordance with an encryption protocol. The end-user device can send data of a particular app via the first VPN client to a particular destination. The end-user device can receive data for the particular app via the same VPN client. In this example, the first server can disallow (e.g., block, reject) a second data type. Instead, system can transport the second data type via the additional server of the additional VPN client. Moreover, the additional server can disallow the first data type. Thus, the system can segment different types of data for the same or different apps through separate VPN clients, which provides a user of the end-user device greater control over data types on the end-user device.

At 310, data is communicated over the additional VPN clients via the additional servers between the end-user device and destination(s). In one example, the data is of the second type. The first VPN client and the additional VPN client can be configured to communicate data of the first type and data of the second type to the same or different destinations. In one example, the end-user device communicates certain data (e.g., of the second type) on the second session via the additional VPN client to the destination(s). The data communicated via the additional VPN client can be secured in accordance with a second encryption protocol, where the second encryption protocol is the same or different from the first encryption protocol.

In one implementation, servers that support VPN clients are configured to directly exchange packet traffic for apps on the end-user device, which can capture sets of packet traffic on a user-basis with different levels of granularity from the entire device or the apps. Further, the end-user device can reroute sets of packet traffic through different VPN clients. For example, a captured set of packet traffic can be rerouted from one VPN client to another VPN client, or the one VPN client can drop captured packets (e.g., packets designated for a particular host).

In another implementation, VPN clients are each configured at the end-user device to route different types of data on selected VPN clients to selected destinations. The different types of data can be generated by multiple apps on the end-user device. The VPN clients can also reroute different data types to different VPN clients that are serially chained or commonly chained. For example, a first VPN client can route a first type of data to an intended destination but reroute a second type of data to another VPN client, which can route the second type of data to the intended destination or can drop packets of the second type of data (e.g., targeted ad content).

At 312, the system terminates one or more sessions of the VPN clients. For example, the end-user device can select particular VPN clients to terminate or terminate all VPN client simultaneously. In one example, a user of an end-user device selects to keep a first VPN client and terminate a second VPN client. As such, packet traffic for the second VPN client can get rerouted for the first VPN client.

In one implementation, the disclosed technology can include an ad-blocking VPN. For example, a primary VPN can capture all packet traffic of the end-user device. Any packets associated with ad host destinations can be identified, quarantined, or dropped. In one example, identified packet traffic is routed to an alternative tunnel for the ad-blocking VPN. The user can thus control whether ads are dropped and not presented on the end-user device. More broadly, a user can configure a client-side VPN chaining architecture to drop certain packets or deny requests from certain hosts by segmenting packet traffic for different VPN clients that are configured to process packet types differently (e.g., packets with different attributes or characteristics can be segmented for different VPN clients).

In another implementation, the disclosed technology can chain a remote VPN client and a Tor VPN client, as described earlier. Tor (The Onion Router) is a free and open-source software for enabling anonymous communications. Tor directs internet traffic through an overlay network including more than seven thousand relays, to conceal a user's location and usage from anyone performing network surveillance or traffic analysis. Using Tor makes it difficult to trace a user's internet activity. Tor can protect the personal privacy of its users, as well as their freedom and ability to communicate confidentially through IP address anonymity using Tor exit nodes. The disclosed technology can encapsulate packets and direct packet traffic to the Tor network and get routed back.

Computer System

Figure 4:
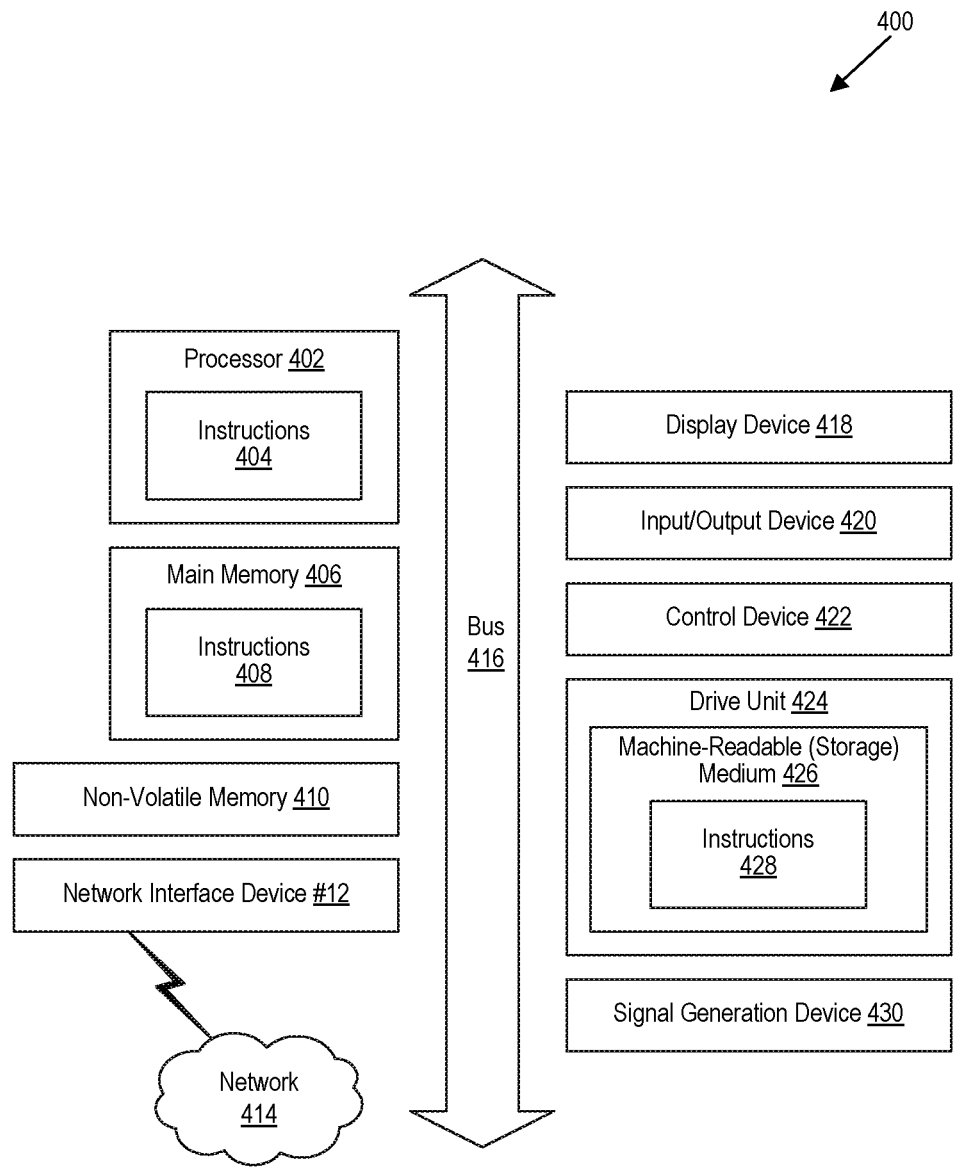
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A handheld mobile device comprising:
   at least one hardware processor; and
   at least one non-transitory memory storing instructions, which, when executed by the at least one hardware processor, cause the handheld mobile device to:
   establish multiple sessions for multiple virtual private network (VPN) clients that are configured to communicate packet traffic in parallel or serially between the handheld mobile device and one or more destinations;
   communicate packet traffic on a first session of the multiple sessions via a first VPN client of the multiple VPN clients to a first destination,
      wherein packet traffic communicated via the first VPN client is secured in accordance with a first encryption protocol;
   communicate packet traffic on a second session of the multiple sessions via a second VPN client of the multiple VPN clients to a second destination,
      wherein packet traffic communicated via the second VPN client is secured in accordance with a second encryption protocol, and
      wherein the first VPN client and the second VPN client are independently and concurrently operable;
   send data of a particular software application through a first interface of the first VPN client to a second interface of the second VPN client,
      wherein the data is routed via a combination of servers that form a pathway for bidirectional traffic between the handheld mobile device and a particular destination; and
   receive response data for the particular software application through the second interface of the second VPN client to the first interface of the first VPN client,
      wherein the response data is routed via the combination of servers that form the pathway for bidirectional traffic.

2. The handheld mobile device of claim 1 further caused to concurrently:
   communicate packet traffic on the first session via the first VPN client for a particular software application on the handheld mobile device; and
   communicate packet traffic on the second session via the second VPN client for the particular software application on the handheld mobile device.

3. The handheld mobile device of claim 1 further caused to concurrently:
   communicate packet traffic of a first software application on the handheld mobile device via the first VPN client; and
   communicate packet traffic of a second software application on the handheld mobile device via the second VPN client,
      wherein the second software application is different from the first software application.

4. The handheld mobile device of claim 1 further caused to concurrently:
   communicate a first data type on the first session via the first VPN client, wherein the first VPN client precludes communication of a second data type; and
   communicate the second data type on the second session via the second VPN client, wherein the second VPN client precludes communication of the first data type.

5. The handheld mobile device of claim 4, wherein the first data type corresponds to a first content type and the second data type corresponds to a second content type different from the first content type.

6. The handheld mobile device of claim 1, wherein the first encryption protocol is different from the second encryption protocol.

7. The handheld mobile device of claim 1, wherein the first destination and the second destination correspond to one or more websites on the internet.

8. The handheld mobile device of claim 1:
   wherein the first VPN client is established by a first server communicatively coupled over a wide area network (WAN) to the handheld mobile device; and
   wherein the second VPN client is established by a second server different from the first server and communicatively coupled over the WAN to the handheld mobile device.

9. The handheld mobile device of claim 8, wherein the first server and the second server are configured to directly exchange packet traffic of a software application that resides on the handheld mobile device.

10. The handheld mobile device of claim 1 further caused to:
   capture sets of packet traffic at the handheld mobile device,
      wherein the captured sets of packet traffic are at different levels of granularity from an entirety of the handheld mobile device or particular apps; and
   route the sets of packet traffic through different VPN clients of the multiple VPN clients.

11. The handheld mobile device of claim 10 further caused to:
  redirect a captured set of packet traffic from one VPN client to another VPN client of the multiple VPN clients.

12. A computer-readable storage medium, excluding transitory signals and carrying instructions, which, when executed by at least one data processor of a system, cause the system to:
  provision multiple virtual private network (VPN) clients that are configured to transport data between an end-user device and multiple servers;
  process data transported via a first VPN client of the multiple VPNs clients through a first server to a first destination,
    wherein the first server is directly connected to the end-user device via the first VPN client;
  communicate a first type of data via the first VPN client through the first server, wherein the first VPN client precludes communication of a second type of data;
  process data transported via a second VPN client of the multiple VPN clients through a second server to a second destination,
    wherein the second server is directly connected to the end-user device via the second VPN client, and
    wherein the first VPN client and the second VPN client are independently and concurrently operable; and
  communicate the second type of data via the second VPN client, wherein the second VPN client precludes communication of the first type of data.

13. The computer-readable storage medium of claim 12, wherein the system is further caused to:
  redirect packet traffic from one VPN client directly to another VPN client of the multiple VPN clients.

14. The computer-readable storage medium of claim 12, wherein the system is further caused to:
  encrypt packet traffic transported via the first VPN client or the second VPN client.

15. The computer-readable storage medium of claim 12, wherein the system is further caused to:
  transport the first type of data via the first server of the first VPN client, and
  transport the second type of data via the second server of the second VPN client.

16. A method of client-side virtual private network (VPN) chaining, the method comprising:
  configuring a first VPN client between an end-user device and a destination via a first server, wherein the first VPN client is configured to route a first type of data to the destination;
  configuring a second VPN client between the end-user device and the destination via a second server,
    wherein the second VPN client is configured to route a second type of data to the destination, and
    wherein the first type of data is different from the second type of data;
  communicating the first type of data on a first session of multiple sessions over the first VPN client via the first server to the destination; and
  communicating the second type of data on a second session of the multiple sessions over the second VPN client via the second server to the destination,
    wherein the first VPN client and the second VPN client are each configured to concurrently communicate the first type of data and the second type of data to the destination,
    wherein the first VPN client precludes communication of the second type of data and the second VPN client precludes communication of the first type of data.

17. The method of claim 16 comprising:
causing the first VPN client to block the second type of data at the first server; and
causing the second VPN client to block the first type of data at the second server.

18. The method of claim 16:
wherein the first VPN client and the second VPN client are each configured at the end-user device to route the first type of data and the second type of data; and
wherein the first type of data and the second type of data are both of one or more software applications on the end-user device.

19. The method of claim 16:
wherein the first VPN client is configured at the first server to route the first type of data; and
wherein the second VPN client is configured at the second server to route the first type of data.

* * * * *